United States Patent [19]

Mount

[11] Patent Number: 4,786,099
[45] Date of Patent: Nov. 22, 1988

[54] TRUCK BED COVER DEVICE

[75] Inventor: Richard Mount, Idyllwild, Calif.

[73] Assignee: Seco Engineering, Highland Park, Ill.

[21] Appl. No.: 45,839

[22] Filed: May 1, 1987

[51] Int. Cl.⁴ .............................................. B60J 7/10
[52] U.S. Cl. ...................................... 296/98; 296/100
[58] Field of Search .................. 296/100, 98; 160/133, 160/130, 138

[56] References Cited

U.S. PATENT DOCUMENTS

| | | | |
|---|---|---|---|
| 896,929 | 8/1908 | McCloud | 160/133 |
| 2,771,319 | 11/1956 | Renquist | 296/100 |
| 3,472,548 | 10/1969 | Comisac | 296/98 |
| 3,488,087 | 1/1970 | Cox | 296/100 |
| 3,774,958 | 11/1973 | Thorpe | 296/98 |
| 3,829,154 | 8/1974 | Becknell | 296/98 |
| 4,046,416 | 9/1977 | Penner | 296/98 |
| 4,138,154 | 2/1979 | McKeon | 296/98 |
| 4,252,362 | 2/1981 | Campbell | 296/98 |
| 4,563,034 | 1/1986 | Lamb | 296/98 |

Primary Examiner—Robert R. Song
Attorney, Agent, or Firm—Neuman, Williams, Anderson & Olson

[57] ABSTRACT

A retractable truck bed cover device is disclosed having a cover comprising a plurality of interconnecting slats, a powered drive mechanism including a rotating sprocket that interstitially engages said cover to move the cover between extended and retracted positions, and a support for said cover at its side edges. In a preferred embodiment, the drive mechanism and support are adapted so that the inventive device can be installed in truck beds of various sizes.

21 Claims, 2 Drawing Sheets

TRUCK BED COVER DEVICE

BACKGROUND OF THE INVENTION

This invention relates to a device for covering the bed of a truck. More particularly, this invention relates to a truck bed cover device including a power driven means for retracting and extending a sturdy cover over the bed of a truck.

Truck bed covers are commonly used with pick-up trucks and like vehicles with cargo areas that are substantially exposed. Such covers are used to protect the cargo of the vehicle from the elements, and also for security purposes. Covers of the prior art include the tarpaulin type, typically made of canvas or other suitable materials. Such covers are generally placed in position manually by one or more persons and are secured by ties, straps, snaps, buckles, or other conventional means. Securely positioning a tarpaulin cover can consume time and labor. Tarpaulins often become loosened by heavy winds, and generally do not provide a high level of security. Removing the tarpaulin can also consume time and labor, and the tarpaulin can be heavy and awkward to store, either on or off the truck.

Other types of prior art covers include those made of elongated parallel slats. Slatted covers may be sturdier than tarpaulins but they can also be even heavier and more difficult to store. Typically slatted covers when in a retracted position are rolled up and held in place by straps or hooks, or they are wound around an axle or cylinder which adds weight to the device and increases its cost.

A number of prior art cover devices of both the tarpaulin and slatted varieties include mechanical means for rolling and unrolling the covers. These devices operate by causing rotation in one direction or another of the axle or cylinder around which the cover means is wound in its retracted position. These mechanical means which operate on the axle or cylinder include cranks, belts, pulleys, spring-loaded rollers, gears, sprockets, and chains. In some cases, these devices are provided with power sources for driving the cylinder or axle. These devices tend to be complex, and difficult to manufacture and install. Furthermore, such mechanisms must be custom sized and fitted for the different trucks with which they are used. Thus, although known, such devices have not met with widespread commercial acceptance.

It would be desirable to provide a motorized truck bed cover device that would be sturdy, easily operated by one person, of uncomplicated construction, simple to manufacture, and lightweight. Additionally it would be desirable to provide such a truck bed cover device that would be adaptable at least in part to truck beds of varying widths.

SUMMARY OF THE INVENTION

It is thus one object of the invention to provide a retractable cover device for a truck bed.

It is another object of the invention to provide such a cover device which can be operated quickly and easily by one person.

It is another object of the invention to provide such a cover device which has a powered driving mechanism which is relatively simple to manufacture and install.

It is another object of the invention to provide such a cover device which is adaptable to accommodate truck beds of different widths.

Other objects, advantages, and novel features of the present invention will be readily apparent to those skilled in the art upon reading the following detailed description and appended claims, and upon reference to the accompanying drawings.

In accordance with the present invention, a retractable truck bed cover device is provided which is sturdy, easily operated by one person, relatively simple to manufacture and install, and adaptable to fit truck beds of different sizes.

The retractable truck bed cover device of the instant invention includes a flexible cover means of interconnecting slats, powered drive means for extending and retracting the cover means, and support means for supporting the cover means in its retracted position. The interconnected slats of the cover means are preferably of a lightweight, durable material such as aluminum or plastic. The powered drive means includes a motor which drives an axle to which one or more sprockets are mounted. Each sprocket has a plurality of circumferential projections so sized and spaced as to extend into the interstices between the interconnected slats of the cover means. Thus when the motor is operated the sprocket is caused to rotate, and, by virtue of the direct interstitial engagement of the circumferential projections between the slats of the cover, causes the cover to either extend or retract, depending on the direction of the sprocket rotation. This unique direct interstitial engagement of the cover means by the sprocket allows the device to be operated without belts, pulleys, cables, springs, or other elements that would be subject to wear and breakage.

The cover means and its powered drive means are stored in a housing in the truck bed immediately behind the truck bed. Electrical connections are provided between the motor mounted in the housing and a switch mounted on the dashboard in the cab of the truck, thus allowing for easy operation of the device by one person. The support means which supports the cover means in its retracted position comprises two channel members into which fit the side edges of the cover means. The channel members are mounted on the interior side walls of the housing. The lower portions of the channel members are advantageously in a spiral configuration so that the cover means is supported in a rolled position when fully retracted, yet without the need for an additional axle or cylinder around which the cover would otherwise be rolled. When in its fully extended position, the cover means extends from an opening in the housing to the truck tailgate. It is preferably supported in this position by guide means mounted on top of the truck bed side walls.

As a further advantage, the retractable cover device of the instant invention is adaptable to accommodate trucks of various widths. The housing mounted to the side walls of the truck bed is expandable. Since the support means are mounted to the interior walls of the housing, they naturally accommodate a cover means of any width that will be accommodated by the housing. The axle which supports the rotating sprockets is also expandable. All of the aforementioned expandable components are adaptable to accommodate the widest and narrowest truck beds on commercially available pickup trucks, and all widths in between. Since these components do not have to be manufactured in different sizes to accommodate different end user requirements, manufacturing of the device is simplified and manufacturing costs are reduced. The instant invention thus provides a simple, lightweight, durable and easily operated motorized truck bed cover device which is adaptable to trucks of different widths.

Figure 1:
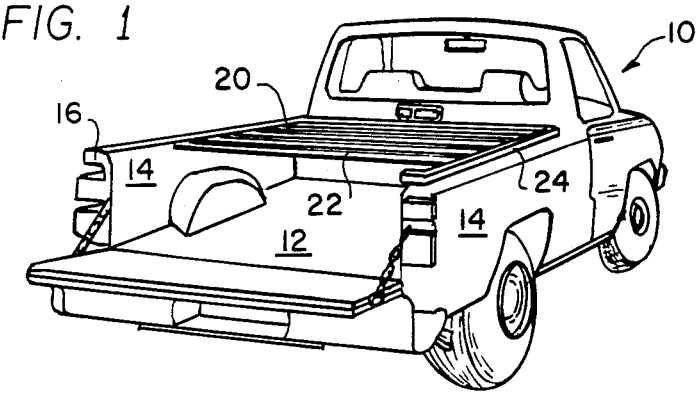
FIG. 1 is a perspective view of a pick-up truck showing the truck bed with the cover device of the instant invention in a partially retracted position.

It will be understood that the invention is not limited to the embodiment illustrated in the figures. Furthermore, it should be understood that the drawings are not to scale and the embodiment is illustrated in part by diagrammatic representations, phantom lines and fragmentary views. In certain instances, details may have been omitted which are not necessary for an understanding of the present invention.

DETAILED DESCRIPTION OF A PREFERRED EMBODIMENT

Reference is made to the accompanying drawings, wherein like reference numerals indicate like parts.

FIG. 1 illustrates a typical pick-up truck 10 having a truck bed 12 with sidewalls 14 and a tailgate 16. The truck 10 is provided with a truck bed cover device of the instant invention, illustrated in FIG. 1 in a partially retracted position. The truck bed cover device includes a cover 20 formed of a plurality of interconnecting slats 21. Cover 20 includes a leading edge 22, a trailing edge 23 as shown in FIGS. 2 and 3, and side edges 24.

Figure 2:
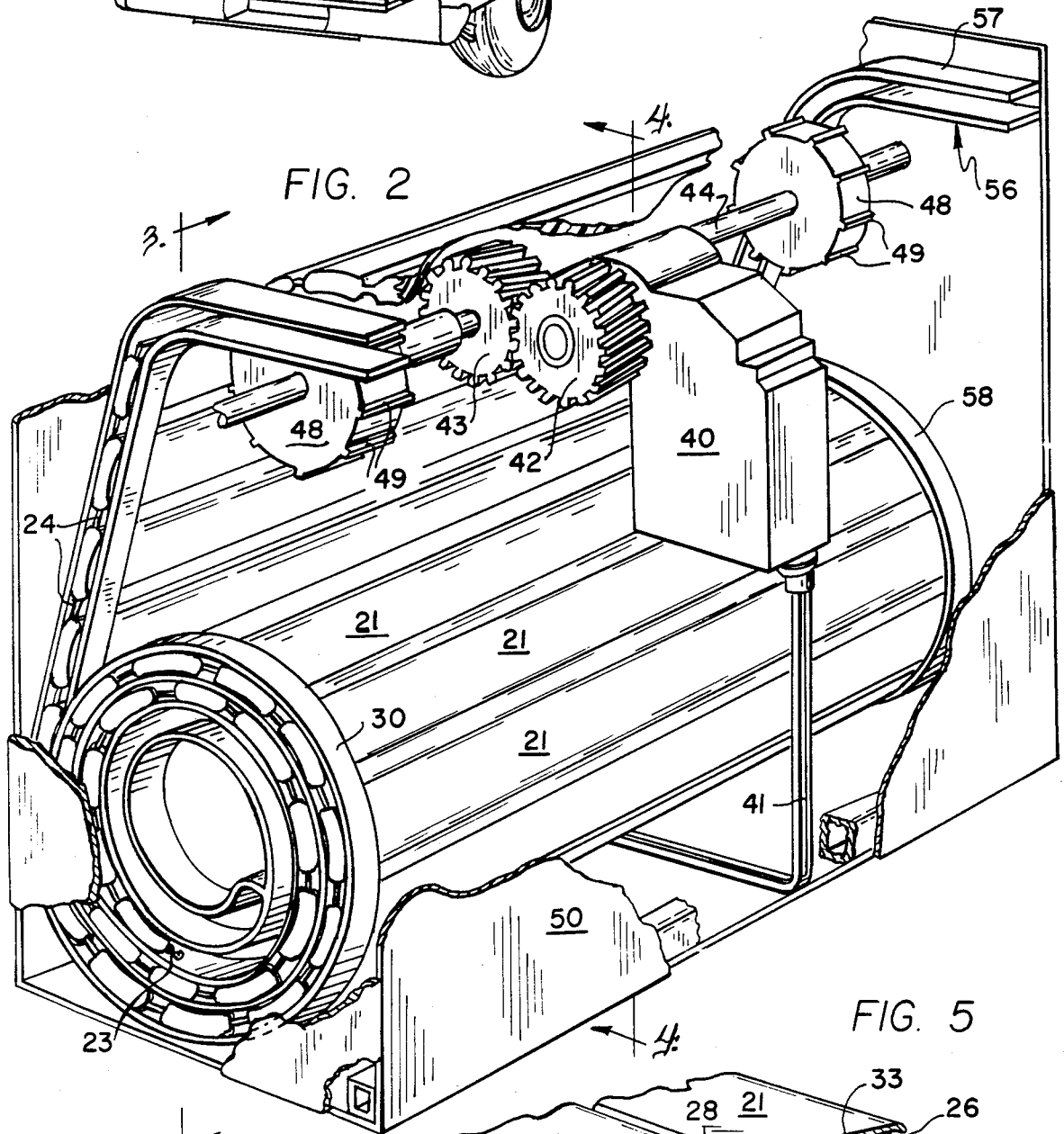
FIG. 2 is a perspective view of the device of the instant invention with the housing partially cut away to show the cover means, powered drive means, and support means.
Figure 3:
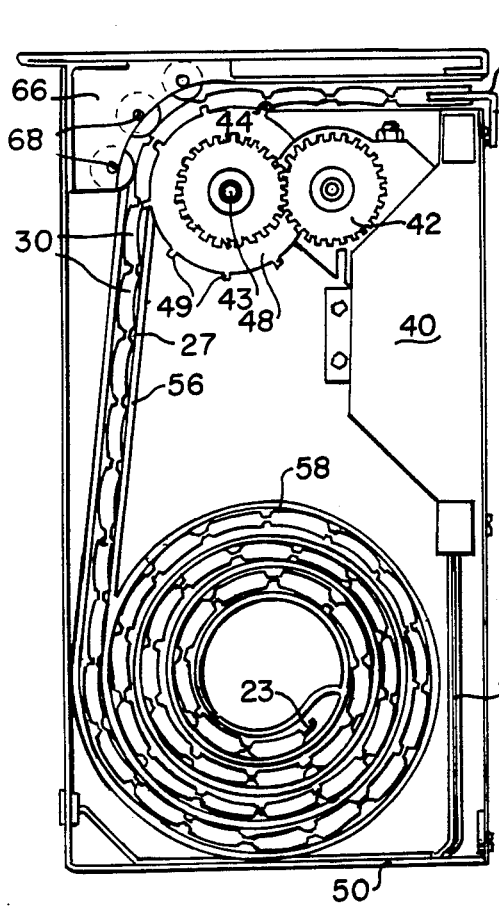
FIG. 3 is an elevational cross-sectional view of the instant invention taken along line 3—3 of FIG. 2, showing the housing, the powered drive means, and the cover means in the retracted position and supported by the support means.

Mounted in the truck bed 12 behind the truck cab is a housing 50 shown partially in FIG. 2, which houses the means for driving the cover 20 between its extended and retracted positions and the means for supporting the cover 20 when in its retracted position.

Figure 5:
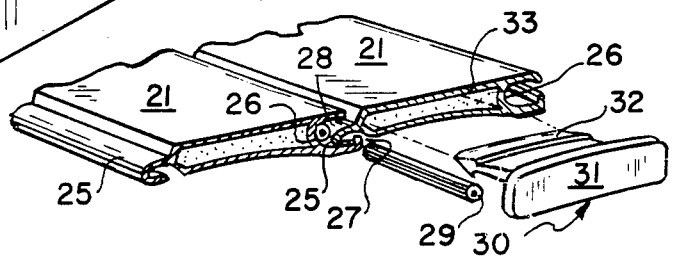
FIG. 5 is a detailed illustration of the interconnecting slats of the cover means.

Interlocking slats 21 suitable for use in the cover means 20 of the instant invention are illustrated in greater detail in FIG. 5. The slats 21 are preferably made of a sturdy, lightweight material such as aluminum or strong plastic. Each slat 21 is elongated so as to have two elongated edges and two side edges. Each slat 21 has at one elongated edge a convex rim 25 of hook-shaped cross-section and at its opposite elongated edge a concave rim 26. Convex rim 25 and concave rim 26 are sized and shaped to interlockingly connect as shown, such that there is an interstice 27 between each concave rim 26 and the body of the adjacent interconnecting slat 21. The purpose of this interstice 27 in the operation of the instant invention will be explained in greater detail hereinafter.

There may also be an interstice 28 between each convex rim 25 and the body of the adjacent interconnecting slat 21. If desired, interstice 28 may be filled with an appropriate weather proofing material such as rubber seals 29 as is known in the art. Further, end caps 30 may be mounted to the side edges the slats 21. End caps 30 include an outer glide surface 31 typically made of a low-friction material such as a smooth plastic. In the embodiment shown, end cap 30 has a projecting member 32 adapted to frictionally fit into a hollow cavity 33 in slat 21, thereby providing effective mounting of end cap 30 to slat 21. Also, in a preferred embodiment, glide surfaces 31 of end caps 30 are sufficiently larger than the side edges of each slat 21, whereby end caps 30 may be used only in alternating slats 21 rather than in each slat 21 while still providing the advantage of reduced friction in the operation of the invention, as will be explained.

Mounted on the interior of housing 50 are support members for supporting the cover 20 in the retracted position. The support members include channels 56 having substantially horizontal portions 57 which extend across the top of the interior of housing 50 and thence downward, terminating in substantially spiral portions 58. Channels 56 are sized to receive side edges 24 of cover 20, including end caps 30. As may be seen especially in FIGS. 2 and 3, when cover 20 is in its retracted position, the spiral portions 58 of channels 56 cause cover 20 to assume a substantially rolled position for efficient storage without necessitating a supporting axle or cylinder. Channels 56 may be separately formed and mounted by conventional means to the interior of housing 50, or preferably channels 56 may be integrally formed with housing 50 for ease in manufacturing, for example, by molding of a sturdy plastic material.

Figure 6:
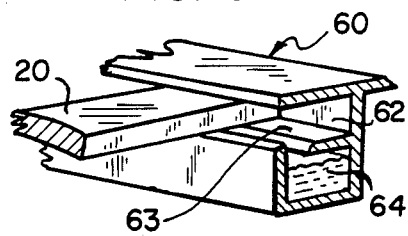
FIG. 6 illustrates the guide means used to support the cover means in an extended position.

In the extended position, cover 20 is supported at its side edges 24 by guide members 60 mounted on side walls 14 of said truck bed 12 and illustrated in FIG. 6. Each guide member 60 includes a channel portion 62 in substantially linear registration with the upper substantially horizontal portions 57 of support members 56 and adapted to accommodate and support a side edge 24 of cover 20. The correct linear registration facilitates ease of movement of the cover 20 from the support members 56 to the guide members 60 and vice versa. Subtending channel portion 62 is a trough portion 64 which can collect water from channel portion 62 through slot 63. Precipitation will thus run off cover 20 to the guide members 60, facilitated thereby in part by weather proofing seals 29, flow from channel portion 62 through slot 63 into trough portion 64, and then drain out at tailgate 16, thereby protecting the cargo in the truck bed from precipitation.

Figure 4:
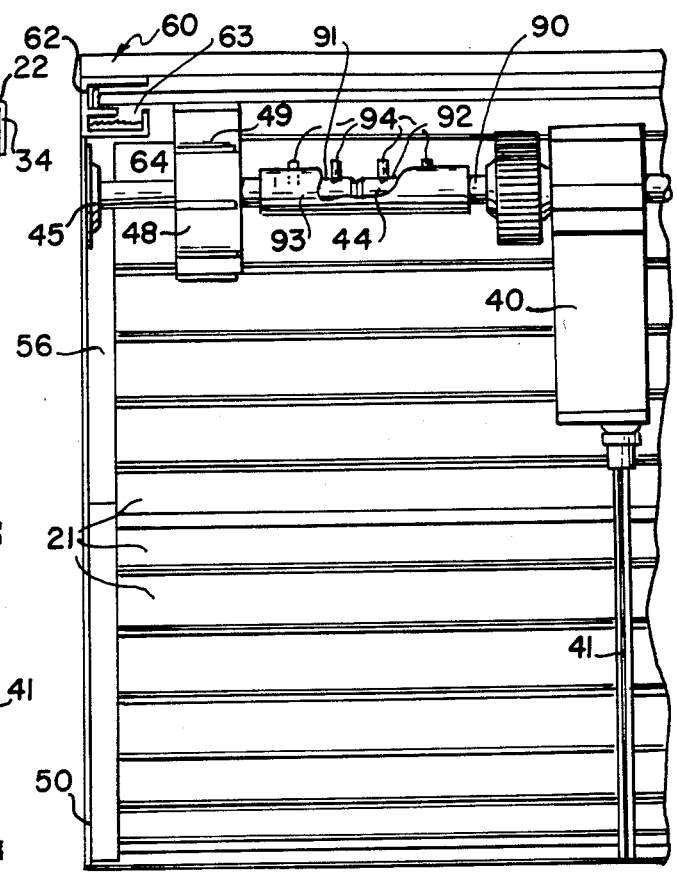
FIG. 4 is a cross-sectional view of the instant invention taken along line 4—4 of FIG. 3.

The means for driving the cover 20 between its extended and retracted positions is illustrated FIGS. 2, 3, and 4. A reversible motor 40 is operated by means of a switch such as a start-stop-start spring-loaded reversible switch as is known in the art. The switch, not shown, is preferably mounted on the dashboard of the truck, and is connected to the motor by leads which may be housed within conduit 41. Reversible motor 40 can be of any commercially available variety, but should be of sufficient capacity to positively drive the weight of cover 20 between its extended and retracted positions. Reversible motor 40 drives first gear 42 which in turn drives second gear 43. Second gear 43 is mounted on axle 44 which is supported in housing 50 by stationary bearings 45. Also mounted on axle 44 are sprockets 48. Each sprocket 48 is provided with a plurality of radially extending circumferential projections 49 which are sized and spaced to fit in the interstices 27 between the interlocking slats 21 of cover 20 as described above.

The operation of the device of the instant invention will be described as the cover is moved from its fully extended position in which it covers the truck bed to its fully retracted position. The device is engaged when the operator pushes a start-stop-start spring-loaded reversible switch mounted on the truck dashboard (not shown). The switch engages reversible motor 40, which causes first gear 42 to rotate in a clockwise direction as viewed from the perspective of FIG. 2, thereby causing second gear 43 and axle 44 to rotate counterclockwise. The rotation of axle 44 causes sprockets 48 to also rotate counterclockwise. Sprockets 48 are mounted so that circumferential projections 49 thereon directly engage the interstices 27 between slats 21 of cover 20. Therefore the counterclockwise rotation of sprockets 48 causes the cover 20 to move in a retracting direction. The motion will continue as long as the operator engages the switch.

As cover 20 retracts, trailing edge 23 of cover 20 descends through support channels 56 and into the spiral portions 58 thereof, such that cover 20 is supported thereby at its side edges 24 in a substantially rolled position. Movement of side edges 24 of cover 20 through guide members 60 and support members 56 is facilitated by glide surfaces 31 of end caps 30 inserted in alternating slats 21. Support members 56 are of a sufficient total length to accommodate the full length of cover 20. In order to prevent cover 20 from slipping down beyond sprockets 48, leading edge 22 of cover 20 is provided with a catch rim 34 adapted to engage housing 50 as shown most clearly in FIG. 3.

As cover 20 moves it is maintained in constant and continuous contact with sprockets 48 by means of idlers 66 as shown in FIG. 3. Due to the irregular shape of cover 20, each idler 66 preferably comprises a plurality of rotatably mounted bushings 68 circumferentially spaced opposite sprocket 48 along the area of engagement between cover 20 and sprocket 48. Each bushing 68 may be covered with rubber hose or tubing to allow ease of motion. In order for the inventive device to perform optimally, it is important that the radial positions of the bushings 68 be carefully adjusted to maintain cover 20 against sprockets 48 while preventing binding of the cover as it enters the spiral portions 58 of channels 56. Such careful adjustments as are necessary will be within the understanding and capability of one of ordinary skill in the art.

Figure 7:
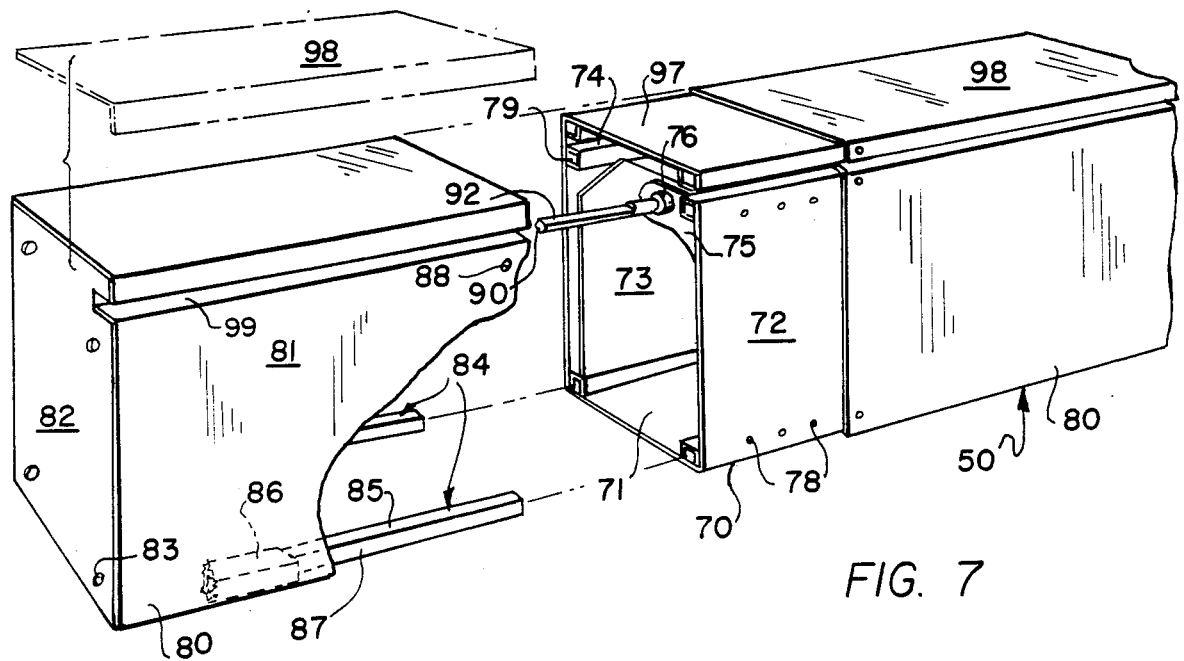
FIG. 7 illustrates the housing and axle of the instant invention being adaptable to truck beds o various widths.

In a preferred embodiment, the inventive device is adaptable to accommodate truck beds of different widths as shown in FIG. 7. In such an embodiment, the housing is formed of three portions in telescoping relation to allow the user to vary the overall width of the housing. As specifically shown in the Figures, the housing 50 comprises central portion 70 and side portions 80 that can overlap with central portion 70.

Central portion 70 includes a bottom wall 71 a front wall 72, a rear wall 73, and two partial side walls 74. Mounted to the interior of front wall 72 is a support member 75 which supports motor 40, first gear 42, second gear 43 (none of which are shown in FIG. 7) and axle support bearings 76. Near the top and bottom of front wall 72 are rows of apertures 78, the spacing between the apertures in each row being predetermined as will be explained hereinafter. The interior of central portion 70 is also provided with a plurality of channel members 79 disposed generally about the internal circumference of central portion 70.

Each side portion 80 includes front wall 81 and side wall 82. It will be recognized that on the interior of side walls 82 are the support members 56 for the cover 20 including the substantially horizontal portions thereof 57 which extend downward to the substantially spiral portions 58, and the stationary bearings 45 which support the axle 44. Side wall 82 is provided with preformed apertures 83 by means of which portion 80 may be mounted to the interior of sidewall 14 of pickup truck 10. The interior of side portion 80 is also provided with a plurality of support bars 84 sized and positioned so as to fit into channel members 79 of central portion 70. Those support bars 84 which are adjacent front wall 81 may be configured as shown with a narrow portion 85 which fits into channel 79 and a wider portion 86 which provides a surface 87 for secure engagement to the interior of front wall 81, such as, for example, by welding or bolting. The remaining support bars 84 may be mounted at side wall 82 only, or may be provided with further support if such is deemed desirable. Front wall 81 is provided with apertures 88.

The adaptable construction of axle 44 is best understood by simultaneous reference to FIGS. 7 and 4. As may be seen, axle 44 includes a central portion 90 and end portions 91. The central and end portions 90 and 91 of axle 44 each have flattened surfaces 92. The area where central axis portion 90 and end axis portion 91 abut one another is surrounded by sleeve 93, as best seen in FIG. 4. Set screws 94 are driven through apertures in sleeve 93 against the surfaces 92 of axle portions 90 and 91 to serve as splines, whereby the axle portions 90 and 91 will rotate in tandem as a single axle unit. It will be appreciated that while axle portions 90 and 91 are illustrated in FIG. 4 as abutting one another within sleeve 93 and therefore in a configuration adapted for the narrowest truck bed, the axle may be adapted for wider truck beds by spacing the ends of axle portions 90 and 91 apart from one another, thereby increasing the overall length of axle 44, as the ends of axle portions 90 and 91 are still received within sleeve 93 and engaged by set screws 94, so that the axle portions 90 and 91 will still rotate in tandem as a single unit.

The device of the instant invention may be assembled and installed in the following manner. Central portion 70 has motor 40, gears 42 and 43, and central axle portion 90 already mounted therein. Side portions 80 are mounted in overlapping telescopic relation over central portion 70, with support bars 84 fitted into channel members 79. The total assembly is loaded onto the bed of the truck 10 and positioned against the back of the truck cab. Center portion 70 is positioned in the center behind the cab and fastened securely. The electrical connections are made from the motor to the start-stop-start switchboard on the dashboard in the cab. Side portions 80 are positioned against the interiors of truck side walls 14 and fastened thereto, with support bars 84 still retained within their respective channel members 79, to assist in maintaining the structural integrity of the device.

The apertures 78 in front wall 72 of center housing portions 70 are spaced to correspond to known variations in truck bed widths. Thus when center housing portion 70 and side housing portions 80 are in their respective positions, apertures 88 in side portions 80 will be aligned with selected apertures 78 in center portion 70, whereby side portions 80 can be readily secured to center portion 70.

End axle portions 91 with sprockets 48 mounted thereon are secured in their respective bearings 45 and secured to center axle portion 90 by means of sleeve 93 and set screws 94. Cover 20 is fed into support members 56 and the idlers 66 and idler bushings 68 are adjusted to obtain the proper tension which will allow ease of movement of cover 20 while maintaining cover 20 in proper engagement with sprockets 48. It will be appreciated that the slats of cover 20 are generally not of expandable width, so that cover 20 is the only substantial component of the instant invention that will need to be provided in a pre-determined size in accordance with the width of a particular truck bed. Finally, the housing is provided with removable center portion lid 97 and removable side portion lids 98. When fitted in place, there is a slot 99 between lids 97 and 98 and front walls 72 and 81 of housing portions 70 and 80. Slot 99 is also in linear registration with horizontal portions 57 of support members 56 and with channel portions 62 of guide members 60, whereby cover 20 will pass through slot 99 as it is extended and retracted.

It will be appreciated that the vertical dimension of the housing will be no greater than the depth of the smallest truck bed with which the invention is intended to be used, although support members 56 will have the capacity to hold a cover 20 as long as the longest truck bed with which the invention is intended to be used. Thus, for deeper truck beds, the inventive device may be mounted above the floor of the truck bed so that slot 99 will be in proper linear registration with support channels 56 and guide means 60. If necessary, various support means such as will be obvious to one of ordinary skill in the art may be used to securely support the inventive device in proper position in the truck bed.

It may be seen that the inventive powered truck bed cover device is simple in its design and manufacture, lightweight, easy to operate by a single person, and yet is adaptable to accommodate truck beds of various widths. The foregoing description of a preferred embodiment is intended for purposes of illustration only and is not intended to limit the scope of the claims. Those skilled in the art, upon review of this disclosure of the instant invention and the embodiments shown herein, will be able to make modifications and other embodiments without departing from the spirit and scope of the invention. It is, therefore, contemplated by the appended claims to cover any such modifications and other embodiments as incorporate the essential features of this invention within the true spirit and scope of the following claims.

I claim:

1. A retractable cover device for enclosing a truck bed having two side walls comprising:
   a cover means comprising a plurality of interconnected slats and interstices between said slats, said cover means having a leading edge, a trailing edge, and two side edges;
   a movable means directly engaging said cover means, said movable means comprising a rotating sprocket means having a plurality of projections, said projections being sized and spaced to directly engage said cover means to said interstices between said slats;
   a drive means for moving said cover means between a retracted position and an extended position, said drive means comprising a power source in cooperative relationship with said movable means such that when said movable means is actuated by said power source the movement thereof is transmitted to said cover means and said cover means is caused to extend or retract; and
   a support means for supporting said cover means when said cover means is in said retracted position.

2. The retractable cover device of claim 1 wherein said support means comprises channel members supporting said cover means at said side edges.

3. The retractable cover device of claim 2 wherein said channel members of said support means comprise a substantially spiral portion which supports said retracted cover means in a substantially rolled position.

4. The retractable cover device of claim 2 wherein said side edges of said cover means have friction-reducing means to facilitate movement to said cover means along said channel members.

5. The retractable cover device of claim 1 wherein said drive means comprises a gear means actuated by said power source and an adjustable length axle operatively connecting said gear means to said movable means.

6. The retractable cover device of claim 5 further comprising adjustable width housing means for housing said drive means and said support means.

7. The retractable cover device of claim 1 further comprising guide means mounted on the side walls of said truck bed for supporting said cover means when said cover means is extended over said truck bed.

8. The retractable cover device of claim 7 wherein said guide means comprise drainage means to aid in the protection of said truck bed from water.

9. The retractable cover device of claim 1 wherein said leading edge of said cover means has a stop means for preventing retraction of the cover means past said drive means.

10. The retractable cover device of claim 9 wherein said stop means is adapted to engage said housing means to prevent retraction of the cover means past said drive means.

11. The retractable cover device of claim 1 further comprising at least one idler means for maintaining said cover means in contact with said movable means.

12. A retractable cover device for enclosing a truck bed having two side walls comprising:
    a cover means comprising a plurality of interconnected slats, said cover means having a leading edge, a trailing edge, and two side edges;
    a movable means directly engaging said cover means;
    a drive means for moving said cover means between a retracted position and an extended position, said drive means comprising a power source in cooperative relationship with said moveable means such that when said movable means is actuated by said power source the movement thereof is transmitted to said cover means and said cover means is caused to extend of retract; and,
    a support means for supporting said cover means when said cover means is in said retracted position, said support means comprising channel members for supporting said cover means at said side edges, said channel members of said support means comprising a substantially spiral portion which supports said retracted cover means in a substantially rolled position.

13. The retractable cover device of claim 12 wherein said side edges of said cover means have friction-reducing means to facilitate movement of said cover means along said channel members.

14. The retractable cover device of claim 12 wherein said cover means comprises interstices between said slats, and said movable means comprises a rotating sprocket means having a plurality of projections, said projections being sized and spaced to directly engage said cover means at said interstices between said slats.

15. The retractable cover device of claim 12 wherein said drive means comprises a gear means actuated by said power source and an adjustable length axle operatively connecting said gear means to said movable means.

16. The retractable cover device of claim 15 further including an adjustable width housing means for housing said drive means and said support means.

17. The retractable cover device of claim 12 further comprising guide means mounted on the walls of said truck bed for supporting said cover means when said cover means is extended over said truck bed.

18. The retractable cover device of claim 17 wherein said guide means comprise drainage means to aid in the protection of said truck bed from water.

19. The retractable cover device of claim 12 wherein said leading edge of said cover means has a stop means for preventing retraction of the cover means past said drive means.

20. The retractable covers device of claim 19 wherein said stop means is adapted to engage said housing means to prevent retraction of the cover means past said drive means.

21. The retractable cover device of claim 12 further comprising at least one idler means for maintaining said cover means in contact with said movable means.

* * * * *